(12) United States Patent
Liang et al.

(10) Patent No.: US 12,401,758 B2
(45) Date of Patent: Aug. 26, 2025

(54) MATERIAL DISPLAY METHOD AND APPARATUS, ELECTRONIC DEVICE, STORAGE MEDIUM, AND PROGRAM PRODUCT

(71) Applicant: Beijing Zitiao Network Technology Co., Ltd., Beijing (CN)

(72) Inventors: Yahan Liang, Beijing (CN); Jiaxin Ma, Beijing (CN); Anan Yi, Beijing (CN); Jun Jiang, Beijing (CN); Xiaoxu Zhang, Beijing (CN); Xu Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/783,767

(22) Filed: Jul. 25, 2024

(65) Prior Publication Data
US 2024/0380860 A1 Nov. 14, 2024

Related U.S. Application Data

(63) Continuation of application No. PCT/CN2023/072057, filed on Jan. 13, 2023.

(30) Foreign Application Priority Data

Jan. 25, 2022 (CN) .......................... 202210089981.6

(51) Int. Cl.
*H04N 5/265* (2006.01)
*G06F 3/0481* (2022.01)
*G06F 3/04845* (2022.01)
(52) U.S. Cl.
CPC ........... *H04N 5/265* (2013.01); *G06F 3/0481* (2013.01); *G06F 3/04845* (2013.01)

(58) Field of Classification Search
None
See application file for complete search history.

(56) References Cited

U.S. PATENT DOCUMENTS 6,434,277 B1 8/2002 Yamada et al.
9,519,999 B1 * 12/2016 Gharpure .................. G06T 7/00
(Continued)

FOREIGN PATENT DOCUMENTS

CN 108447043 A 8/2018
CN 112672185 A 4/2021
(Continued)

OTHER PUBLICATIONS

China National Intellectual Property Administration, Office Action Issued in Application No. 202210089981.6, Mar. 18, 2023, 12 pages.
(Continued)

*Primary Examiner* — Kyle Zhai
(74) *Attorney, Agent, or Firm* — Alleman Hall & Tuttle LLP

(57) ABSTRACT

The present application relates to a material display method and apparatus, an electronic device, a storage medium, and a program product. The method comprises: obtaining captured first video images and obtaining a trajectory image according to position information of a target recognition object in the captured first video images; obtaining a plurality of target unit effect images according to the trajectory image; and generating a target element according to the plurality of target unit effect images, and displaying the target element in a captured second video image, wherein the target element has a main body which is a solid geometric structure comprising a plurality of geometric surfaces, and the plurality of target unit effect images are attached to the plurality of geometric surfaces respectively
(Continued)

to display the plurality of target unit effect images on the plurality of geometric surfaces.

18 Claims, 9 Drawing Sheets

(56) References Cited

U.S. PATENT DOCUMENTS

| | | | |
|---|---|---|---|
| 11,107,279 B1* | 8/2021 | Cowburn | G06Q 50/01 |
| 2019/0012729 A1 | 1/2019 | Kishimoto | |
| 2022/0292643 A1* | 9/2022 | Palmer | G06T 7/248 |
| 2023/0328197 A1 | 10/2023 | Gao et al. | |
| 2024/0022681 A1 | 1/2024 | Zhang et al. | |

FOREIGN PATENT DOCUMENTS

| | | |
|---|---|---|
| CN | 112929582 A | 6/2021 |
| CN | 113487709 A | 10/2021 |
| CN | 113888681 A | 1/2022 |
| CN | 114430466 A | 5/2022 |
| EP | 4274221 A1 | 11/2023 |
| JP | 2000090290 A | 3/2000 |
| JP | 2019016091 A | 1/2019 |

OTHER PUBLICATIONS

ISA China National Intellectual Property Administration, International Search Report Issued in Application No. PCT/CN2023/072057, Mar. 17, 2023, WIPO, 5 pages.
China National Intellectual Property Administration, Notification of Reexamination for Chinese Application No. 202210089981.6, mailed Oct. 31, 2024, 16 Pages.
European Patent Office, Extended European Search Report for European Application No. 23746003.5, mailed Mar. 11, 2025, Germany, 8 pages.
Japan Patent Office, Office Action Issued in Application No. 2024-544463, May 27, 2025, 6 pages.

* cited by examiner

MATERIAL DISPLAY METHOD AND APPARATUS, ELECTRONIC DEVICE, STORAGE MEDIUM, AND PROGRAM PRODUCT

CROSS-REFERENCE TO RELATED APPLICATIONS

The present disclosure is based on and claims the benefit of Chinese application for invention 202210089981.6, filed on Jan. 25, 2022, the disclosure of which is hereby incorporated into this disclosure by reference in its entirety.

TECHNICAL FIELD

The present disclosure relates to the field of Internet technology, in particular to a material display method and apparatus, an electronic device, a storage medium and a program product.

BACKGROUND

With the continuous development of the Internet technology, the technology of human-computer interaction between intelligent terminals and users has become more mature. Many applications involve human-computer interaction, bringing more enjoyment to users through human-computer interaction in entertainment scenes.

Applications can provide users with effects for use and display in existing human-computer interaction scenarios.

SUMMARY

According to some embodiments of the present disclosure, there is provided a material display method, comprising:
  obtaining captured first video images and obtaining a trajectory image according to position information of a target recognition object in the captured first video images;
  obtaining a plurality of target unit effect images according to the trajectory image; and
  generating a target element according to the plurality of target unit effect images, and displaying the target element in a captured second video image, wherein the target element has a main body which is a solid geometric structure comprising a plurality of geometric surfaces, and the plurality of target unit effect images are attached to the plurality of geometric surfaces respectively to display the plurality of target unit effect images on the plurality of geometric surfaces.

In some embodiments, the obtaining the plurality of target unit effect images according to the trajectory image comprises:
  superimposing the trajectory image on a material image corresponding to the target element to obtain a unit effect image; and
  performing replication and mirroring operations on the unit effect image to obtain the plurality of target unit effect images.

In some embodiments, the superimposing the trajectory image on the material image corresponding to the target element to obtain the unit effect image comprises:
  mirroring the trajectory image to obtain a mirror image corresponding to the trajectory image; and
  superimposing the trajectory image and the mirror image on different regions of the material image corresponding to the target material to obtain the unit effect image.

In some embodiments, the obtaining the trajectory image according to the position information of the target recognition object in the captured first video images comprises:
  drawing two circular regions on a pre-constructed canvas according to positions of the target recognition object in two successively captured first video images; and
  drawing a rectangular region on the pre-constructed canvas according to a line connecting the positions of the target recognition object in the two successively captured first video images, wherein a length of width sides of the rectangular region is equal to a diameter of a circular region of the circular regions, the width sides of the rectangular region are sides perpendicular to the line, and midpoints of the width sides of the rectangular region coincide with center points of the circular regions, the circular regions and the rectangular region belong to a trajectory; and
  drawing the trajectory according to every two successively captured first video images until the trajectory is complete to obtain the trajectory image.

In some embodiments, the method further comprises:
  performing a blur process on the trajectory image to make the trajectory have a glowing effect in the trajectory image.

In some embodiments, a length of length sides of the rectangular region is directly proportional to a length of the line, and the length sides of the rectangular region are sides parallel to the line.

In some embodiments, the blur process is a Gaussian blur process.

In some embodiments, the generating the target element according to the plurality of target unit effect images comprises: moving each of the plurality of target unit effect images along a path corresponding to the each of the plurality of target unit effect images respectively to attach the each of the plurality of target unit effect images onto a geometric surface of the plurality of geometric surfaces corresponding to the each of the plurality of target unit effect images to obtain the target material.

In some embodiments, the displaying the target element in the captured second video image comprises:
  displaying, in the captured second video image, the target element by rotation with a rotation axis corresponding to the solid geometric structure as a rotation center.

In some embodiments, the target element is a lantern.

In some embodiments, the displaying the target element in the captured second video image comprises: displaying the target element in a subsequently captured second video image.

In some embodiments, the method further comprises: adding, in a subsequently captured second video image, at least one of a foreground image, a filter, a text, or a sticker which match the target element.

According to some embodiments of the present disclosure, there is provided a material display apparatus, comprising:
  an image acquisition module configured to obtain captured first video images;
  a trajectory generation module configured to obtain a trajectory image according to position information of a target recognition object in the captured video images;
  a material generation module configured to obtain a plurality of target unit effect images according to the trajectory image, and generate a target element according to the plurality of target unit effect images;

a display module configured to display the target element in a captured second video image, wherein the target element has a main body which is a solid geometric structure comprising a plurality of geometric surfaces, and the plurality of target unit effect images are attached to the plurality of geometric surfaces respectively to display the plurality of target unit effect images on the plurality of geometric surfaces.

According to further embodiments of the present disclosure, there is provided an electronic device comprising:

a memory configured to store computer program instructions;

and a processor configured to execute the computer program instructions to cause the processor to perform the material display method according to any of the embodiments described above.

According to further embodiments of the present disclosure, there is provided a non-transitory readable storage medium, comprising: computer program instructions that, when executed by at least one processor, cause the at least one processor to perform the material display method according to any of the embodiments described above.

According to further embodiments of the present disclosure, there is provided a computer program product that, when running on a computer, causes the computer to perform the material display method according to any of the above embodiments.

According to further embodiments of the present disclosure, there is provided a computer program, comprising: instructions that, when executed by a processor, cause the processor to perform the material display method according to any of the above embodiments.

DESCRIPTION OF THE DRAWINGS

Herein, the accompanying drawings, which are incorporated in and constitute a part of this specification, illustrate embodiments of the present disclosure and, together with the description, serve to explain the principles of the present disclosure.

In order to more clearly explain the embodiments of the present invention or the technical solutions in the prior art, a brief introduction will be given below for the drawings required to be used in the description of the embodiments or the prior art. It is obvious that, for a person skilled in the art, he or she may also acquire other drawings according to such drawings on the premise that no inventive effort is involved.

DETAILED DESCRIPTION

In order to better understand the above objects, features and advantages of the present disclosure, the scheme of the present disclosure will be further described below. It should be noted that, in the case of no conflict, the embodiments and the features of the embodiments of the present disclosure may be combined with each other.

Many specific details are set forth in the following description to facilitate a full understanding of the present disclosure, but the present disclosure can also be implemented in other ways different from those described herein. Obviously, embodiments described in the description are only some embodiments of the present disclosure, and are not all of embodiments thereof.

The material display method of the present disclosure may be performed by the material display apparatus of the present disclosure, which may be implemented in the form of software and/or hardware. In some embodiments, the material display apparatus may be an electrical device, comprising: a tablet computer, a mobile phone (such as, a foldable phone, a large screen phone, etc.), a wearable electronic device, an augmented reality (AR)/virtual reality (VR) device, a notebook computer, an ultra-mobile personal computer (UMPC), a netbook, a personal digital assistant (PDA). The particular type of the electronic device is not specifically limited in the present disclosure.

In the following embodiments, taking an electronic device as an example, the material display method provided by the present disclosure will be described in detail with reference to the accompanying drawings and specific application scenarios.

Figure 1:
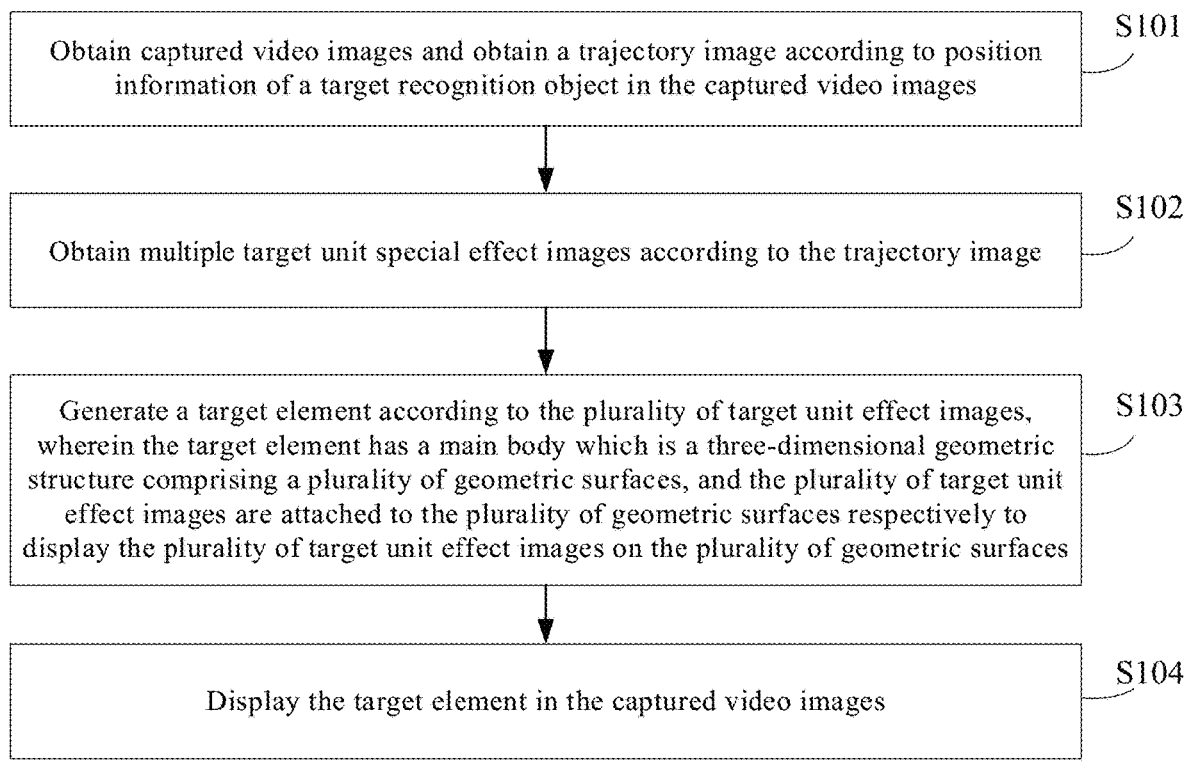
FIG. 1 is a flowchart of a material display method provided in some embodiments of the present disclosure.

FIG. 1 is a flowchart of a material display method provided in some embodiments of the present disclosure. As shown in FIG. 1, the material display method of the embodiments comprises: steps S101 to S104.

In step S101, captured first video images are obtained and a trajectory image is obtained according to position information of a target recognition object in the captured first video images.

The captured first video images are images that are currently being collected or captured by an electronic device through an image capture module (such as a camera) within an image capture area corresponding to the image capture module. A size, a resolution, and other parameters of the captured first video images are not specifically limited in this disclosure.

Each of the captured video first images may comprise a target recognition object. The target recognition object is not specifically limited in the disclosure. For example, the target recognition object may be a particular part of a human body, such as a finger, a nose, eyes, a mouth in a face, etc.

An electronic device obtains the captured video first images and can perform an image recognition on the captured first video images to determine whether the target recognition object is comprised in each of the captured first video images, and obtain position information of the target recognition object in each of the captured first video images. The present disclosure has no specific limitation on an image recognition method adopted by the electronic device. For example, an image recognition model can be used in the electronic device to perform the image recognition on the captured first video images. The image recognition model can be, but is not limited to, a neural network model, a convolutional network model, etc.

Of course, the electronic device can also perform the image recognition on the captured first video images in other ways to obtain the position information of the target recognition object in each of the captured first video images.

The following is an example illustrating how an electronic device draws a trajectory to obtain a trajectory image according to position information of a target recognition object in captured first video images, in which a face of a user is located within an image capture area corresponding to an image capture module of the electronic device, the image capture module of the electronic device captures images of the face, and the target recognition object is a nose in the face.

After obtaining the captured first video images, the electronic device can draw a circular material on a pre-constructed canvas according to position information of a key point corresponding to the nose in the face of the user in each of the captured first video images. A rectangular material is used to connect a newly drawn circular material with a circular material drawn based on a previous first video image. The rectangular material may overlap with the circular materials. Since first video images captured by the electronic device are usually images captured continuously, as a number of the captured first video images increases, more and more circular and rectangular materials are drawn in real time to dynamically display a trajectory image that is generated according to the user's actions.

The position information of the target recognition object in each of the captured first video images can be represented by coordinates of the target recognition object in each of the captured first video images, and a coordinate system corresponding to the coordinates can be established according to actual needs. For example, a two-dimensional coordinate system can be established with a lower left corner of each of the captured first video images as an origin of the two-dimensional coordinate system, a horizontal direction as a horizontal axis, and a vertical direction as a vertical axis. Of course, the two-dimensional coordinate system can also be established in other ways.

The canvas can be understood as a base carrying the trajectory image. This disclosure has no limitation on a size, color and other parameters of the canvas. For example, a size of the canvas can be related to a size of various surfaces of a target object comprised in a target 3D effect, and a color of the canvas can be a preset color, such as white, gray, black, and any other color.

A circular region (which can also be referred as the circular material) and a rectangular region (which can also be referred as the rectangular material) are drawn on the canvas. In an initial state, a size of the circular material (such as its diameter or radius) can be a preset value. Then, a size of the circular material can change according to a speed of movement of the nose in the face. The initial state mentioned here represents a state of a circular material which is drawn based on a first one of the captured first video images. When drawing the circular materials and the rectangular materials on the canvas, the color of the circular materials and the rectangular materials is different to that of the canvas, allowing the trajectory to be clearly presented to the user. For example, the canvas can be black, while the circular and rectangular materials can be white.

In some embodiments, when drawing the trajectory image, a specific camera can be used to present the trajectory. It should be noted that the specific camera referred to here is a virtual camera, not a real physical camera. A ClearType is set to Amaz.CameraClearType.Done for the camera before the trajectory image is drawn. In this way, a drawn part of the trajectory image in a previous frame will not be cleared, thereby creating an effect of a brush drawing the trajectory. The ClearType represents a clear mode of the virtual camera. Amaz.CameraClearType.Done means that the clear mode of the virtual camera is set to Not Clear, i.e., content of the trajectory image drawn previously is not cleared and can be presented to the user.

In S102, a plurality of target unit effect images are obtained according to the trajectory image.

In some embodiments, the target element is the element comprised in an effect to be achieved, and a main body of the target element may be a solid (three-dimensional) geometric structure, such as a conical structure, a cylindrical structure, a prismatic structure, a spherical structure comprising a plurality of curved surfaces, and so on. The solid geometric structure generally comprises a plurality of geometric surfaces, and the target unit effect images are images that need to be attached to the plurality of geometric surfaces comprised in the main body of the target element and to be displayed.

Sizes, shapes and other parameters of the plurality of target unit effect images may be the same or different, and are related to a structure of the main body of the target element, and thus are determined depending on specific situations.

In some embodiments, a superimposition process can be perform to a material image corresponding to the target element and the trajectory image to obtain a unit effect image. The electronic device can perform replication and mirroring operations on the unit effect image to obtain a plurality of target unit effect images.

The superimposition process mentioned above refers to replacing a background of the trajectory image with the material image corresponding to the target element. If the target element is a lantern, the material image corresponding to the target element is an initial material image used to attached to the plurality of geometric surfaces of the lantern body. Here, the initial material image is a material image without the trajectory image drawn by the user superimposed on it.

The replication operation refers to a process of creating identical images based on the unit effect image. The mirroring operation refers to a process of generating images that are axisymmetric relative to a specific axis based on the unit effect image. A number of replication and mirroring operations can be determined by a number of geometric surfaces in the solid geometric structure of the target object.

In some embodiments, the electronic device can mirror the trajectory image to obtain a mirror image corresponding to the trajectory image, and then superimpose the trajectory image and the mirror image corresponding to the trajectory image on different regions of the material image respectively to obtain the unit effect image. Two regions in the material image on which the trajectory image and the mirror image corresponding to the trajectory image are superimposed may be in a mirrored state, or the two regions may be considered to be axisymmetric relative to a given axis (such as a horizontal axis).

In other embodiments, shapes and sizes of the plurality of geometric surfaces of the main body of the target element are not exactly the same. The electronic device can store material images corresponding to the plurality of geometric surfaces of the target element in advance. After obtaining the trajectory image, the electronic device can superimpose the trajectory image on the plurality of material images respectively to obtain the plurality of target unit effect images.

Note that when the trajectory image is superimposed on the material image, a size of the trajectory image may not be the same as a size of the material image. Therefore, the size of the trajectory image can be adjusted to match the size of the material image by aligning the trajectory image with the material image. For example, if the size of the trajectory image is 720*1280 and the size of the material image is 1024*1024, the trajectory image can be adjusted to 1024*1024, and then the adjusted trajectory image can be superimposed on the material image.

In step S103, a target element is generated according to the plurality of target unit effect images, wherein the target element has a main body which is a solid geometric structure comprising a plurality of geometric surfaces, and the plurality of target unit effect images are attached to the plurality of geometric surfaces respectively to display the plurality of target unit effect images on the plurality of geometric surfaces.

Referring to the description of step S102, the main body of the target element is the solid geometric structure, which can typically comprise the plurality of geometric surfaces. The target unit effect images can be considered as images presented on the plurality of geometric surfaces contained in the main body of the target element.

The process of generating the target element according to the plurality of target unit effect images can be understood as a process of adapting each of the target unit effect images to a position, a size, etc. of a geometric surface corresponding to the each of the target unit effect images in the main body of the target element by rotating, shifting, scaling and other operations, so that the target unit effect images can be fitted on the geometric surfaces of the solid geometric structure for display.

In addition, a process of generating the target element can be presented through an animation. For example, if the target element is a lantern, a preset lantern model can be used to achieve the process. Specifically, a lantern skeleton is created by wiring according to a patch frame structure of the lantern model. After skin binding, the lantern model is split into individual patches. The animation is played back in reverse to show the process of generating the target element. Each of the patches in the lantern model corresponds to a target unit effect image.

In step S104, the target element is displayed in a second captured video image.

After generating the target element by the above method, the target element can be presented in the second captured video image according to a preset display method, such as one or more of rotating display, up and down movement, left and right swinging, forward and backward swinging, etc., which is not specifically limited in this disclosure and can be set according to actual needs.

In some embodiments, the preset display method may comprise displaying, in the second captured video image, the target element by rotation with a rotation axis corresponding to the solid geometric structure as a rotation center. During the rotational, the rotation axis may also swing left and right. For example, if the target element is a lantern, it can be superimposed on top of the second captured video image for display. The lantern rotates with a central axis of a lantern body as a rotation axis to present the various surfaces of the lantern. In addition, the lantern can also swing left and right during the rotation. A display position of the lantern can be set according to the needs. For example, the lantern can be displayed in an area near a top of a screen of the electronic device, ensuring that the lantern does not obstruct the user's face in the second captured video image during the display of the lantern.

In addition, during a process of displaying the target element in the second captured video image, a foreground image, as well as a filter, text, a sticker, etc. that match the target element can be added to the second captured video image. The foreground image, filter, text, sticker, etc. that match the target element can be predetermined.

It should be noted that video images used to identify the target recognition object and generate the trajectory image are different from video images on which the target element is superimposed. Alternatively, it can also be considered as the electronic device identifying the target recognition object in real time according to captured first video images during the process of capturing a video clip 1, generating the trajectory image, and then generating the target element according to the trajectory image. The electronic device then captures a video clip 2 in real time and presents the target element in the second video image(s) contained in the video clip 2 according to a preset animation manner. Video clips 1 and 2 may be two consecutive video clips, with video clip 1 preceding video clip 2.

In the method provided in the above embodiments, the captured first video images are obtained and the trajectory image according to the position information of the target recognition object in the captured first video images. A superposition process is performed according to the trajectory image and the material image corresponding to the target element to obtain a plurality of target unit effect images. The plurality of target unit effect images are assembled to obtain the target element, wherein the main body of the target element is a solid geometric structure that comprises a plurality of geometric surfaces, the plurality of target unit effect images being fitted onto the geometric surfaces respectively, to present the plurality of target unit effect images on the plurality of geometric surfaces of the solid geometric structure. In this scheme, a trajectory is drawn according to the user's actions and is used as one of materials for generating the target element, thereby achieving user participation in the design of the target element, which is conducive to improving the user interaction experience. In addition, the main body of the target element in an effect generated by the above scheme is a three-dimensional structure, which can enhance a visual expression of the effect.

According to the description of the embodiment shown in FIG. 1, the material display method provided by the present disclosure will be introduced with the scenario shown in FIGS. 2A to 2F as an example, in which the electronic device is a mobile phone on which a video editing application (hereinafter referred to as App 1) is installed. In some embodiments shown in FIGS. 2A to 2F, taking a target 3D effect as lantern effect as an example (that is, a target element is a lantern, and a target recognition object is a nose tip in a face), a process of drawing a trajectory image, generating a lantern effect, and presenting the lantern effect is illustrated.

Figure 2A:
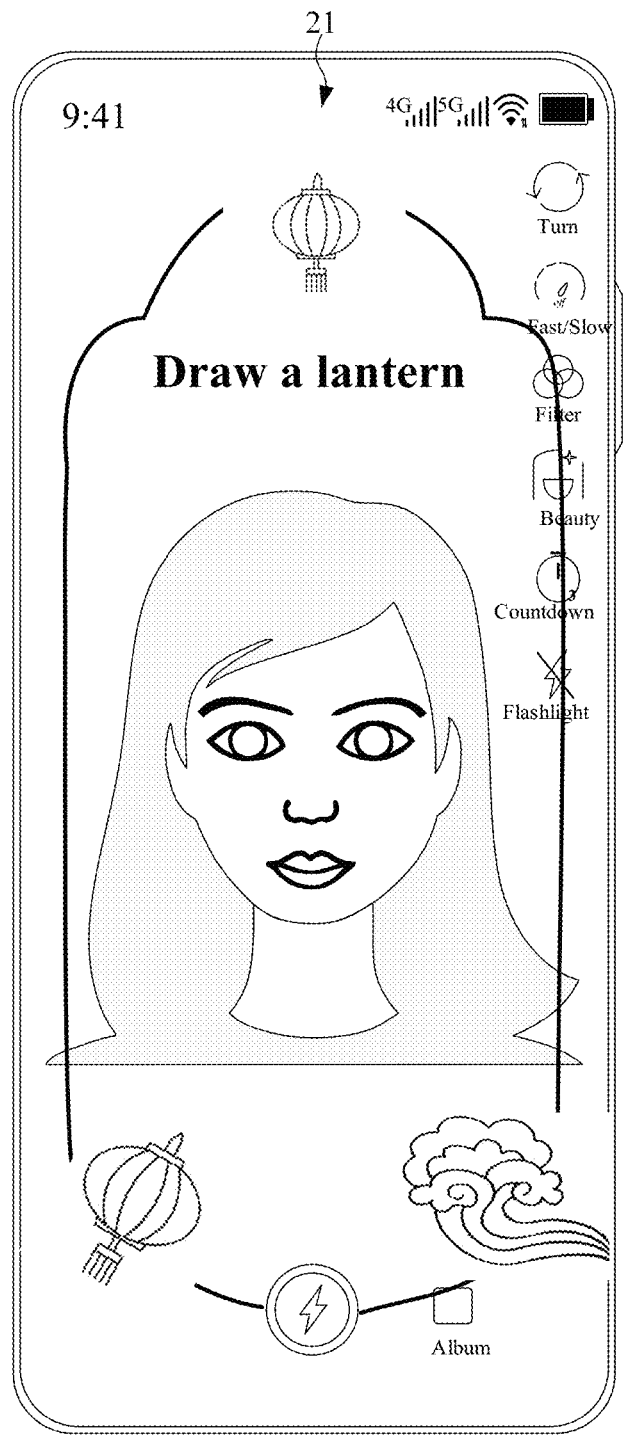
FIGS. 2A to 2F are diagrams showing effects provided in some embodiments of the present disclosure.

In response to a user triggering an icon corresponding to the lantern effect, an App 1 can display, for example, a user interface 21 as shown in FIG. 2A on a mobile phone, and display prompt information in the user interface 21 to prompt the user to start drawing a lantern. The prompt information may be one or more of text, animation, sound, etc., and the disclosure has no limitation on display parameters, such as font, font size, color, etc. of the text. In some embodiments, as shown in FIG. 2A, a prompt text content "Draw a lantern" is displayed in an area near a top of the user interface 21, and a lantern animation can be displayed when displaying content of the prompt text. In addition, a length of time the prompt text content is displayed can be specified in advance, such as 1s, 2s, etc.

In response to the length of time that the prompt text content is displayed reaching a specified length of time, the App 1 can recognize a nose tip in a face of the user 1 and display a brush at the nose tip of the user 1. For example, in the embodiment shown in FIG. 2B, a brush is displayed at the nose tip of the user 1, and this disclosure has no limitation on the style of the brush.

In the embodiment, it is assumed that a main body of the lantern is a sphere with a central axis along a vertical direction as an axis of rotation, and curved surfaces corresponding to every 45 degrees with respect to the axis of rotation as geometric surfaces. In addition, when the brush is displayed, a lantern patch corresponding to the curved surfaces can be superimposed on the captured first video images, and the lantern patch is a material image corresponding to the lantern effect.

In the embodiment, since the curved surfaces corresponding to every 45 degrees are the geometric surfaces, the 8 geometric surfaces surrounding the central axis of the sphere have the same shape and size. Therefore, the App 1 can display the lantern patch, allowing users to experience the scene of drawing on the lantern patch to improve the user experience.

In some embodiments, the App 1 can display a portion of the lantern patch, such as a lower half of the lantern patch (or an upper half of the lantern patch). In addition, in such an implementation, a portion of the lantern patch that is not present can be masked, as shown in the embodiment shown in FIG. 2B. In the embodiment shown in FIG. 2B, the lower half of the lantern patch shown in a user interface 22 can also be considered as an effective drawing area of a trajectory image.

In this way, when the user draws a trajectory image in the lower half of the lantern patch, the App 1 can mirror the drawn trajectory image to obtain a mirror image corresponding to the trajectory image, and superimpose the mirror image on the upper half (or lower half) of the lantern patch. A pattern on a target lantern patch obtained in this way has a symmetrical effect, which can provide users with extensive visual effects and enhance an expressiveness of the lantern effect.

In some embodiments, the App 1 can display an entire lantern patch, and the user can draw a trajectory image in an area corresponding to the entire lantern patch. This method is simple and can be quickly implemented on the electronic device. In this case, the entire lantern patch shown in the App 1 is the effective drawing area of the trajectory image.

In some embodiments, instead of displaying the lantern patch to the user, the App 1 may show a trajectory drawing area that is independent of a shape of the lantern patch.

In some embodiments, the App 1 can display an entire lantern patch, and the user can draw in an area corresponding to the entire lantern patch. The electronic device can only record a trajectory drawn by the user in a lower (or upper) half of the lantern patch.

In addition, in some cases, a time length can be set for. To enable the user to understand remaining time for drawing the trajectory, the remaining time can also be displayed in the user interface in the form of a progress bar. For example, referring again to FIG. 2B, a progress bar can be displayed in an area near a top of the user interface 22. It is preferable that the progress bar does not obstruct a face area of a user 1 in the first captured video image and the lower half of the lantern patch as much as possible to ensure the user's experience of drawing lantern patterns.

User 1 can move his nose tip by moving his face, and the App 1 displays a trajectory image drawn on a mobile phone by tracking the movement of user 1's nose tip. In some embodiments, the trajectory image drawn by user 1 is shown in FIG. 2C.

In some possible cases, a time length for drawing can be set in advance, which is not limited in this disclosure. For example, the time length for drawing can be 5s, 6s, 7s, etc., which can be set according to actual situations.

Figure 2B:
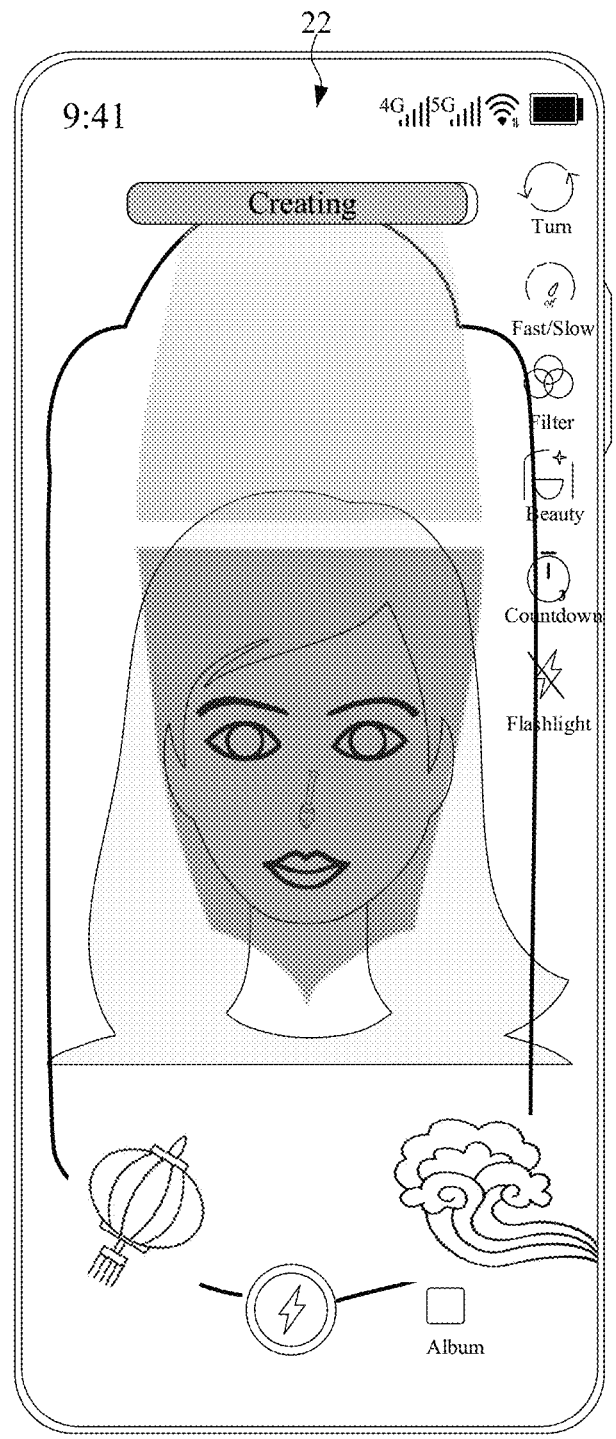
Figure 2C:
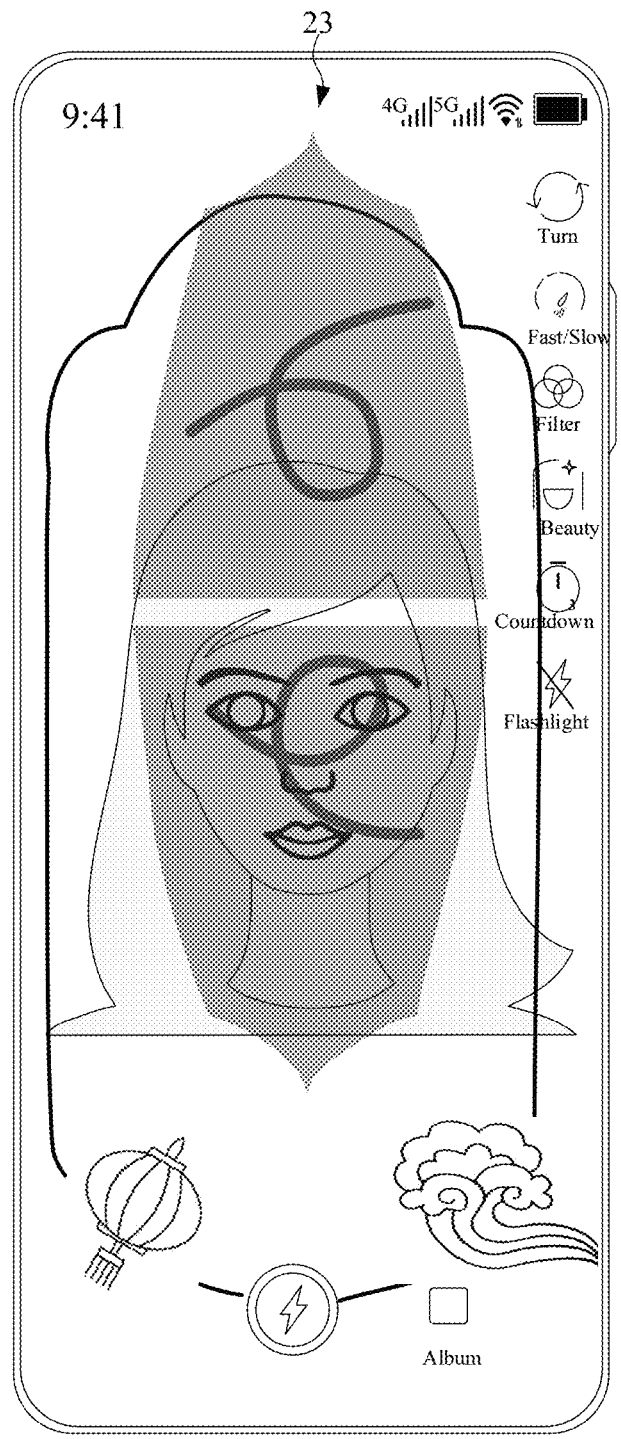

According to the embodiment shown in FIG. 2B above, the lower half of the lantern patch is the effective drawing area. During a process of user 1 moving his face, the his nose tip may move out of the lower half of the lantern patch, that is, move out of the effective drawing area. The App 1 may not record the trajectory portion outside the effective drawing area, and only record the portion drawn within the effective drawing area.

Figure 3:
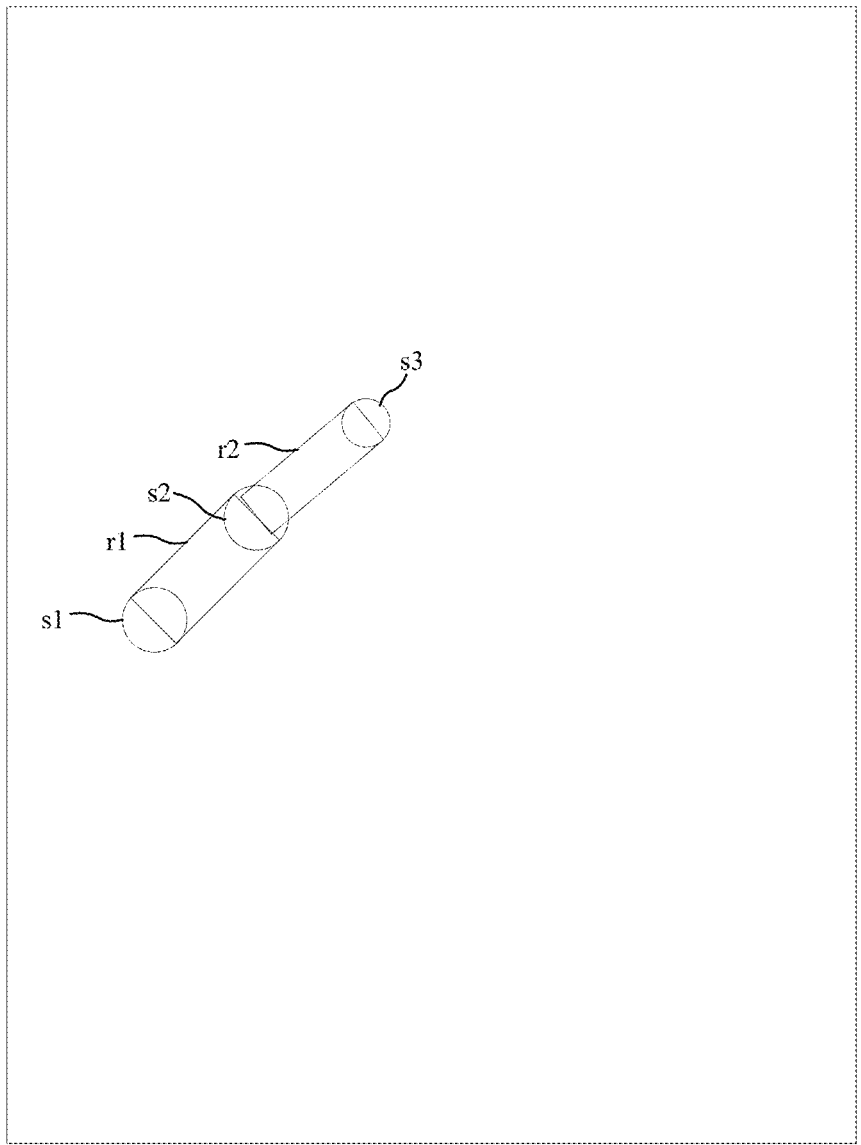
FIG. 3 is a schematic diagram of a trajectory pattern provided in some embodiments of the present disclosure.

An introduction to drawing a trajectory is given with reference to an embodiment shown in FIG. 3.

Referring to the embodiment shown in FIG. 3, assuming that the App 1 obtains a first video image and identifies a position of the user 1's nose tip in the first video image, a circular material s1 is drawn on a pre-constructed canvas. A position of the circular material s1 on the canvas is determined according to the position of the user 1's nose tip in the first video image, and a diameter of the circular material s1 can be a preset value. After obtaining a second video image, the App 1 identifies a position of user 1's nose tip in the second video image, and draws a circular material s2 and a rectangular material r1 that connects the circular material s1 and the circular material s2 on the canvas. A diameter of the circular material s2 can be determined according to a length of a connecting line between a center of the circular material s1 and a center of the circular material s2. The longer the length of the connecting line, the thinner the thickness of the trajectory is, and the shorter the length of the connecting line, the thicker the thickness of the trajectory is.

By calculating a dwell time of the nose tip to control a brush diameter (i.e., the diameter of the circular material), the thickness of the brush can be regulated, which is similar to the actual stroke effect of painting.

Suppose that a length of a connecting line between positions of the user 1's nose tip in two adjacent video frames is represented by len, Y and basescale are first and second parameters that relate to a size of a circular material respectively, and spotX represents the size of the circular material. Since a length of a side of a rectangular material perpendicular to a drawing direction is the same as the size of the circular material, determining the size of the circular material is equivalent to determining the size of the rectangular material.

In some embodiments, the size of the circular material can be determined by the following method.

In Step a, the length len of the connecting line between the positions of the nose tip of user 1 in two adjacent video frames is substituted into an inverse scaling function $Y=A1-len$ to obtain a value of the first parameter Y, wherein A1 is a preset constant, for example, $A1=0.04$.

if Y is greater than a preset value A2, determine a value of the second parameter basescale in step b; if Y is less than or equal to the preset value A2, determine the value of the second parameter basescale in step c. For example, $A2=0.01$.

In Step b, the value of the second parameter basescale is determined according to a formula basescale=min (basescale+a1*Y, Y).

In Step c, the value of the second parameter basescale is determined according to a formula basescale=max(basescale−a2*Y, Y).

In the above formulas, a1 and a2 are preset constants, for example, $a1=0.02$, $a2=0.01$. Values of a1 and a2 mainly affect a thickness regulation of the trajectory. Therefore, the values of a1 and a2 can be set according to actual situations.

In Step d, a value of spotX is determined according to a formula spotX=max (a3, min (basescale, a4)).

In the above formula, a3 and a4 are preset minimum and maximum values of a size-related parameter of the circular material, such as a3=0.003 and a4=0.04.

After determining the value of spotX, it can be multiplied by a preset size of the circular material to obtain the size of the circular material (such as its diameter or radius).

In steps a to d above, parameters a1 to a4 can be understood as scaling factors corresponding to the circular material.

According to the formulas shown in steps a to d, in order to prevent sudden changes in the thickness of the trajectory and to achieve a natural gradual and smooth change in the thickness of the trajectory, the preset value A2 is used as a judging condition. When Y exceeds A2, the size of the circular material increases at a rate of 0.02 (i.e., a1), and an upper limit is Y; when Y is less than or equal to A2, the size of the circular material decreases at a rate of 0.01 (i.e., a2), and a lower limit is Y.

According to the embodiment shown in FIG. 1, it can be seen that the App 1 can present the trajectory via a specific camera. Therefore, when a third video image is captured and a circular material s3 and a rectangular material r2 are drawn according to the third video image, the circular material s1, the circular material s2 and the rectangular material r1 previously drawn can be retained and not be cleared, thereby presenting the drawing process to the user.

Similarly, as the App 1 obtains more and more captured video images, more and more circular and rectangular materials can be drawn on the canvas in the above manner to create a trajectory image.

In order to achieve a more attractive visual effect, e.g., to make the trajectory in the trajectory image to have a glowing effect, the trajectory image can also be blurred. When performing blur processing, the App 1 can generate a texture according to the canvas and the circular materials and rectangular materials drawn on the canvas, and blur the entire generated texture to achieve a glowing effect. Note that after drawing a new circular material and a rectangular material on the canvas according to a new video image, a new texture must be generated and blurred to achieve a real-time glowing effect.

Furthermore, the present disclosure places no limitation on a blurring method, which may be, but is not limited to, Gaussian blurring, mean blurring, median blurring, etc.

In addition, a transparency of the trajectory area in the trajectory image (i.e., areas of all circular materials and rectangular materials) can be set to a preset transparency value, such as 50%, 60%, and so on. This disclosure has no limitation on a preset value of the transparency.

According to the embodiment shown in FIG. 2C, after the user has drawn the trajectory image, the App 1 can mirror the trajectory image to obtain a mirror image corresponding to the trajectory image. The trajectory image is superimposed on the lower half of the lantern patch, and the mirror image corresponding to the trajectory image is superimposed on the upper half of the lantern patch to obtain a target lantern patch.

After obtaining the target lantern patch, the App 1 can display the target lantern patch on a mobile phone. That is, a user interface 23 shown in FIG. 2C is switched to a user interface 24 shown in FIG. 2D. Referring to the embodiment shown in FIG. 2D, the App 1 can display the target lantern patch in a upper area of the user interface 24. Of course, the target lantern patch can also be displayed in other positions.

The App 1 can present the target lantern patch in a preset manner, for example, the target lantern patch can be gradually reduced in size.

Figure 2D:
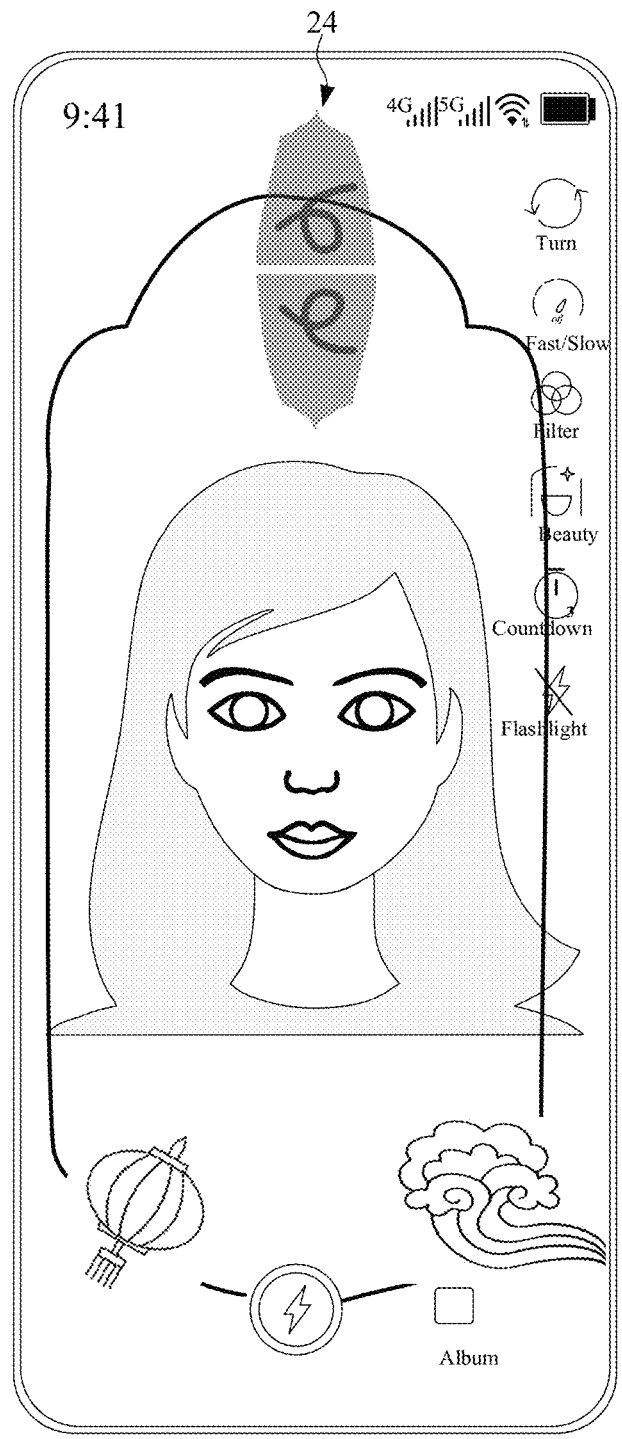

In the embodiment, since the main body of the lantern is composed of 8 curved surfaces linked sequentially, it is possible to perform replication and mirroring operations on the target lantern patch shown in FIG. 2D to obtain 8 target lantern patches arranged separately on a display screen.

Figure 2E:
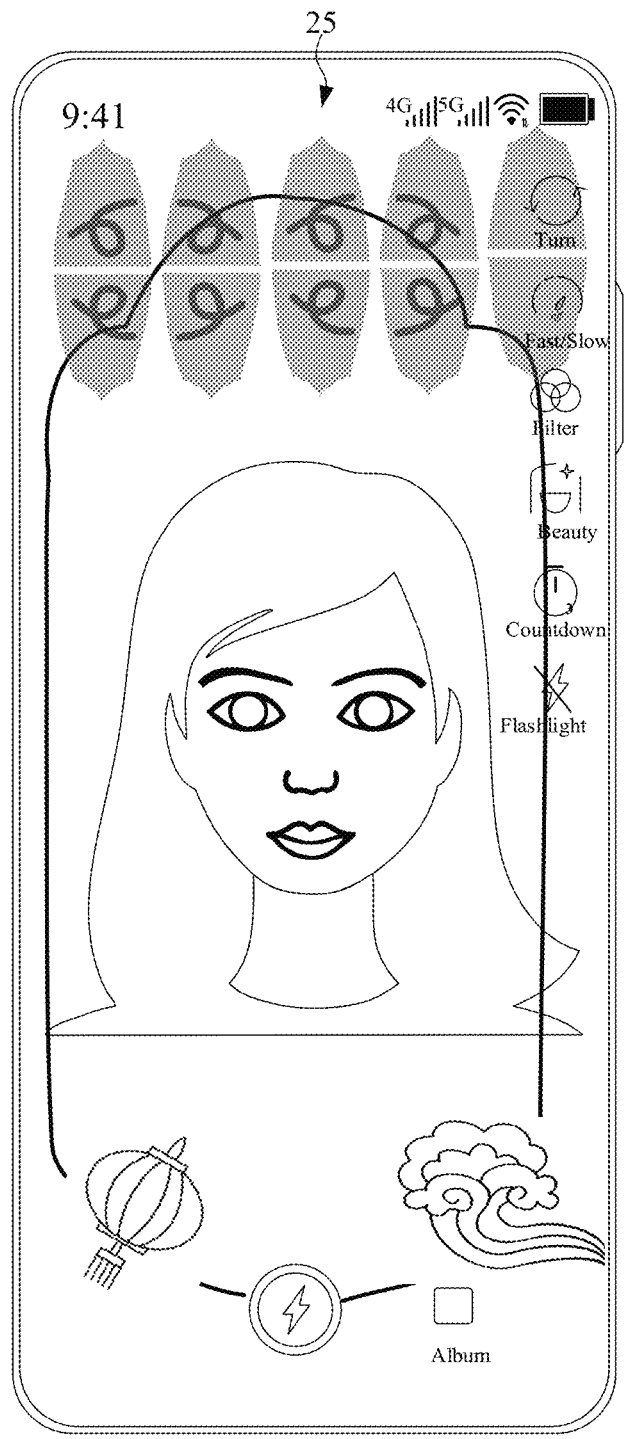

In some embodiments, referring to the embodiment shown in FIG. 2E, 8 target lantern patches can be horizontally arranged in an area near a top of a user interface 25.

In some cases, due to a diversity of a shape of the main body of the lantern, there may be a larger number of target lantern patches. Because of a limited screen size of a mobile phone, it is also possible to display some target lantern patches horizontally in an area near a top of the user interface 25. For example, in the user interface 25 shown in FIG. 2E, 5 target lantern patches are displayed.

After the 8 target lantern patches are obtained, they can be assembled according to their respective assembly parameters in an animation corresponding to the lantern effect to achieve the lantern effect. For example, the 8 target lantern patches arranged horizontally in a row can be moved along a preset path and attached to the 8 curved surfaces corresponding to the 8 target lantern patches of the main body the lantern. Alternatively, the 8 target lantern patches can be placed together on the 8 curved surfaces corresponding to the 8 target lantern patches of the main body the lantern.

The assembly parameters corresponding to a target lantern patch can comprise: a parameter of a path corresponding to the target lantern patch in three-dimensional space, a scaling size of the target lantern patch, etc. The three-dimensional space referred to here can be a three-dimensional coordinate system established according to the main body the lantern. The parameter of the path corresponding to the target lantern patch can comprise coordinate values of each pixel of the target lantern patch in the three-dimensional coordinate system. The path can be composed of a plurality of discrete points, and for each point on the path, each pixel in the target lantern patch has a set of coordinate values corresponding the each point on the path.

It should be noted that during an assembly process, other elements comprised in the lantern, such as end caps at opposite ends of the lantern, decorative elements of the lantern (such as tassels connected to a bottom end cap of the lantern), can also be assembled with the main body of the lantern to create a more vibrant lantern effect.

Figure 2F:
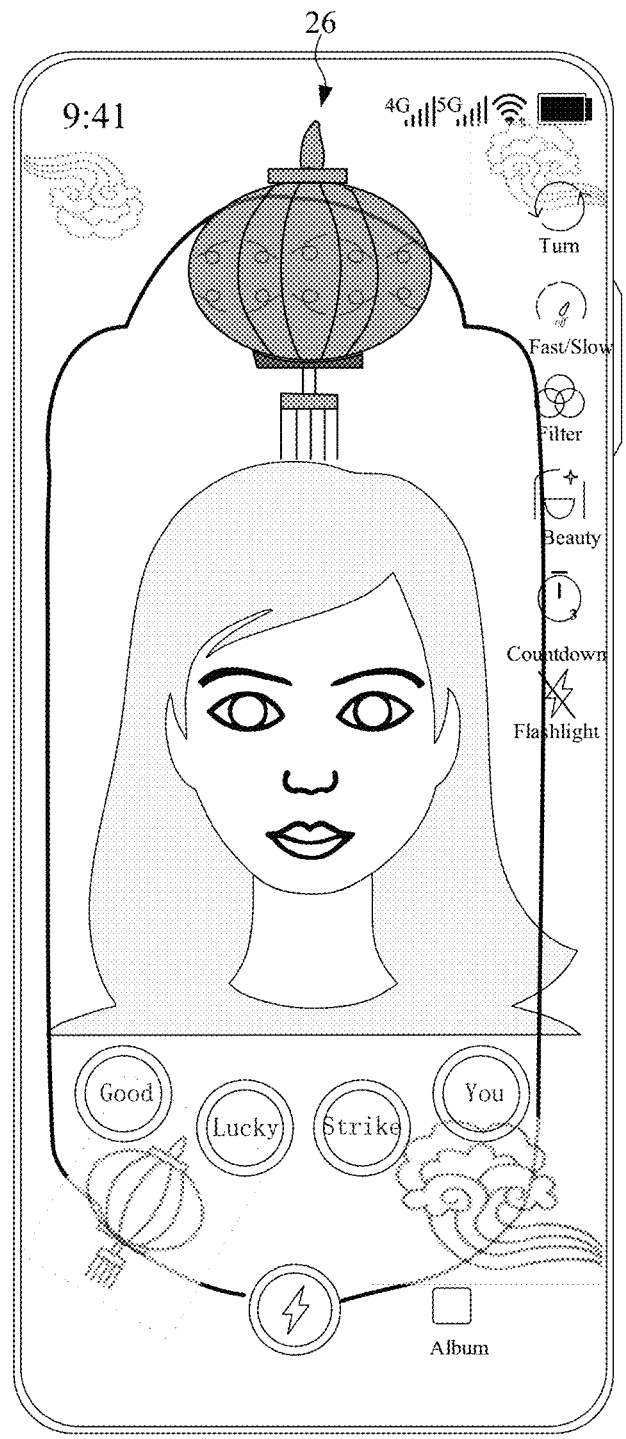

The App 1 may then switch in a preset transition manner from a user interface 25 shown in FIG. 2E to a user interface 26 shown in FIG. 2F, thereby displaying the lantern effect. When displaying the lantern effect, images on various curved surfaces of the lantern can be displayed by rotation with a central axis of a spherical body of the lantern as a rotation center.

In addition, a preset filter, a display effect (such as a glowing effect), etc. can be added to enhance a visual redisplay of the lantern effect.

In addition, a rotational display duration, such as 3s, 4s, etc., can be specified in advance. When a preset rotational display duration ends, a video recording stops.

In addition, during the process of rotational display of the lantern effect, the central axis of the main body of the lantern can be moved by, such as left/right shifting, left/right swinging, forward/backward moving, and so on.

In addition, a preset foreground image, filter, text, sticker, etc. that matches the lantern effect can also be provided. When switching from the user interface 25 to the user interface 26, a foreground image as well as a filter, text, a sticker, etc. that matches a target 3D effect can be added to the captured second video image. Taking a foreground image as an example, elements contained in the foreground image are distributed mainly along edges of the foreground image to minimize an occlusion of user 1's face area in the captured second video image as well as the generated lantern effect. For example, in the embodiment shown in FIG. 2F, the foreground image showing lantern elements is superimposed on the captured second video image, and the text "Good Lucky Strike You" is displayed in an area near a bottom. The foreground image, text, sticker, etc. may have an animated effect.

According to the embodiment shown in FIGS. 2A to 2F, it can be seen that a process of obtaining a plurality of target lantern patches is a 2D animation process, while a subsequent assembly of the plurality of target lantern patches to generate a lantern effect and the display of the lantern effect are 3D animation processes. The connection between the 2D animation process and the 3D animation processes is achieved in a preset transition manner, which makes screen switching natural and smooth, providing a better user experience.

Figure 4:
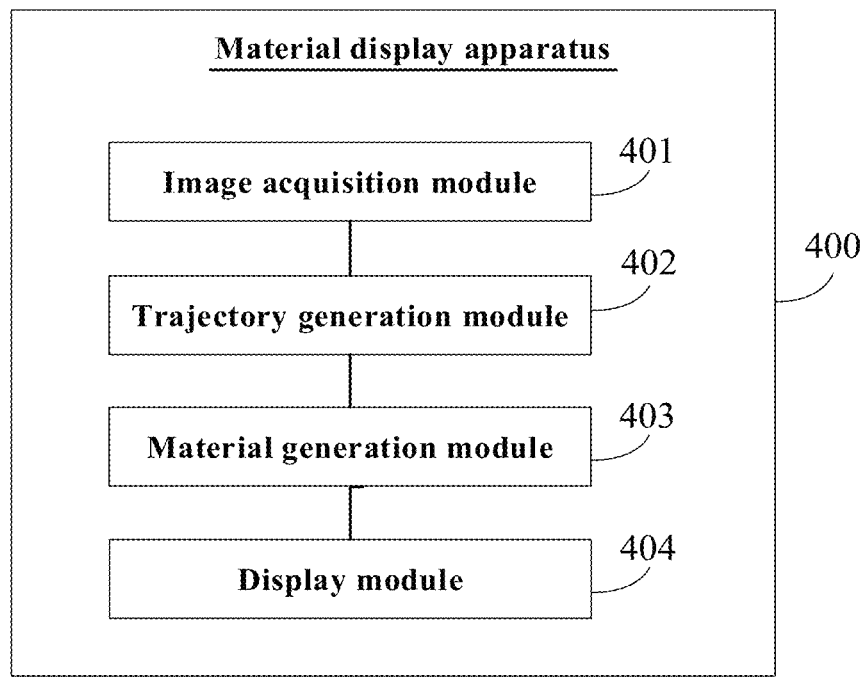
FIG. 4 is a schematic structure diagram of a material display apparatus provided in some embodiments of the present disclosure.

FIG. 4 is a schematic structure diagram of a material display apparatus provided in some embodiments of the present disclosure. As shown in FIG. 4, the material display apparatus 400 of this embodiment comprises: an image acquisition module 401, a trajectory generation module 402, a material generation module 403, and a display module 404.

The image acquisition module 401 is configured to obtain captured first video images.

The trajectory generation module 402 is configured to obtain a trajectory image according to position information of a target recognition object in the captured first video images.

The material generation module 403 is configured to obtain a plurality of target unit effect images according to the trajectory image, and generate a target element according to the plurality of target unit effect images.

The display module 404 is configured to display the target element in a captured second video image.

The target element has a main body which is a solid geometric structure comprising a plurality of geometric surfaces, and the plurality of target unit effect images are attached to the plurality of geometric surfaces respectively to display the plurality of target unit effect images on the plurality of geometric surfaces.

In some embodiments, the material generation module 403 is configured to superimpose the trajectory image on a material image corresponding to the target element to obtain a unit effect image; and perform replication and mirroring operations on the unit effect image to obtain the plurality of target unit effect images.

In some embodiments, the material generation module 403 is configured to mirror the trajectory image to obtain a mirror image corresponding to the trajectory image; and superimpose the trajectory image and the mirror image on different regions of the material image corresponding to the target material to obtain the unit effect image.

In some embodiments, the trajectory generation module 402 is configured to draw two circular regions on a pre-constructed canvas according to positions of the target recognition object in two successively captured first video images; draw a rectangular region on the pre-constructed canvas according to a line connecting the positions of the target recognition object in the two successively captured first video images, wherein a length of width sides of the rectangular region is equal to a diameter of a circular region of the circular regions, the width sides of the rectangular region are sides perpendicular to the line, and midpoints of the width sides of the rectangular region coincide with center points of the circular regions, the circular regions and the rectangular region belong to a trajectory; and draw the trajectory according to every two successively captured first video images until the trajectory is complete to obtain the trajectory image.

In some embodiments, the trajectory generation module 402 is further configured to perform a blur process on the trajectory image to generate a trajectory with a glowing effect in the trajectory image.

In some embodiments, a length of length sides of the rectangular region is directly proportional to a length of the line, and the length sides of the rectangular region are sides parallel to the line.

In some embodiments, the blur process is a Gaussian blur process.

In some embodiments, the material generation module 403 is configured to move each of the plurality of target unit effect images along a path corresponding to the each of the plurality of target unit effect images respectively to attach the each of the plurality of target unit effect images onto a geometric surface of the plurality of geometric surfaces corresponding to the each of the plurality of target unit effect images to obtain the target material.

In some embodiments, the display module 404 is configured to display, in the captured second video image, the target element by rotation with a rotation axis corresponding to the solid geometric structure as a rotation center.

In some embodiments, the display module 404 is particularly configured to display the target element in a subsequently captured second video image.

In some embodiments, the display module 404 is further configured to add, in a subsequently captured second video image, at least one of a foreground image, a filter, a text, or a sticker which match the target element.

In some embodiments, the target element is a lantern. Accordingly, the special effect comprising the target element is a lantern effect.

The material display apparatus provided in this embodiment can perform the material display method provided in any of the above method embodiments, and its principle of implementation and the technical effect achieved are similar to those of the method embodiments. Reference can be made to the above method embodiments for details which will not be repeated for simplicity.

Figure 5:
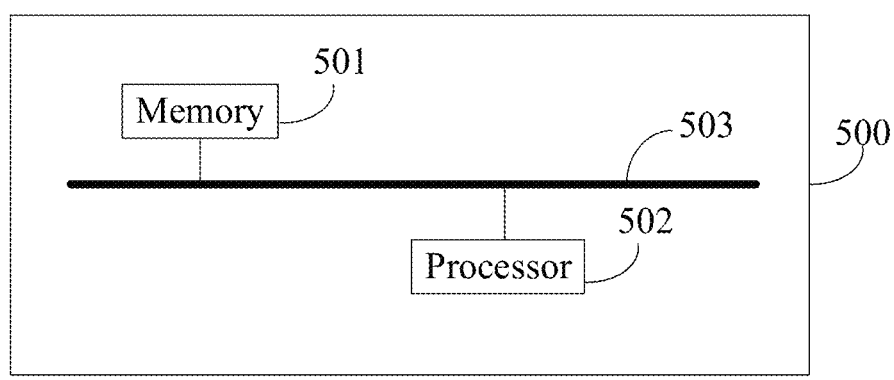
FIG. 5 is a schematic structural diagram of an electronic device provided in some embodiments of the present disclosure.

FIG. 5 is a schematic structural diagram of an electronic device provided in some embodiments of the present disclosure. As shown in FIG. 5, the electronic device 500 provided by this embodiment comprises: a memory 501 and a processor 5022.

The memory 501 can be an independent physical unit and can be connected to the processor 502 through a bus 503. The memory 501 and the processor 502 can also be integrated as hardware.

The memory 501 is used to store program instructions, and the processor 502 calls the program instructions to perform the operations of any one of the above method embodiments.

Optionally, when some or all of the methods in the above embodiments are implemented by software, the electronic device 500 may comprise only a processor 502. The memory 501 configured to storing programs is located outside the electronic device 500, and the processor 502 is connected to the memory through circuits/wires for reading and executing programs stored in the memory.

The processor 502 can be a central processing unit (CPU), a network processor (NP), or a combination of CPU and NP.

The processor 502 may further comprise hardware chips. The above hardware chips may be application specific integrated circuits (ASICs), programmable logic devices (PLDs), or a combination thereof. The above PLD may be a complex programmable logic device (CPLD), a field programmable gate array (FPGA), a general array logic (GAL), or any combination of thereof.

The memory 501 may comprise volatile memory, such as random access memory (RAM). The memory may also comprise non-volatile memory, such as flash memory, hard disk drive (HDD), or solid-state drive (SSD). The memory may also comprise a combination of any of the above types of memory.

An embodiment of the present disclosure further provides a computer-readable storage medium, comprising: computer program instructions that, when executed by at least one processor of an electronic device, implement the material display method provided by any one of the above method embodiments.

An embodiment of the present disclosure further provides a computer program product comprising a computer program stored in a computer-readable storage medium, wherein at least one processor of the electronic device can read the computer program from the computer-readable storage medium, and execute the computer program to cause the electronic device to implement the material display method provided by any one of the above method embodiments.

Note that, in this description, the use of relational terms, if any, such as "first" and "second" and the like are used solely to distinguish one from another entity or action without necessarily requiring or implying any actual such relationship or order between such entities or actions. Further, terms "comprise", "comprise" or their any other variations are intended to encompass non-exclusive composition, so that a process, method, product or device comprising a series of factors may comprise not only these factors, but also other factors that are not listed explicitly, or factors intrinsic to this process, method, product or device. Without limitation, a factor defined by wording "comprise one . . . " does not exclude the existence of other same factors in a process, method, product or device comprising such factor.

The above descriptions are only specific embodiments of the present disclosure, so that those skilled in the art can understand or implement the present disclosure. Various modifications to these embodiments will be apparent to those skilled in the art, and the generic principles defined herein may be implemented in other embodiments without departing from the spirit or scope of the present disclosure. Accordingly, the present disclosure should not be limited to the specific embodiments described herein, but should be accorded the broadest scope consistent with the principles and novel features disclosed herein.

The invention claimed is:

1. A material display method, comprising:
   obtaining captured first video images;
   obtaining a trajectory image according to position information of a target recognition object in the captured first video images;
   obtaining a plurality of target unit effect images according to the trajectory image;
   generating a target element according to the plurality of target unit effect images; and
   displaying the target element in a captured second video image,
   wherein the target element has a main body which is a solid geometric structure comprising a plurality of geometric surfaces, and the plurality of target unit effect images are attached to the plurality of geometric surfaces respectively to display the plurality of target unit effect images on the plurality of geometric surfaces, and
   wherein the obtaining the trajectory image according to the position information of the target recognition object in the captured first video images comprises:
      drawing two circular regions on a pre-constructed canvas according to positions of the target recognition object in two successively captured first video images;
      drawing a rectangular region on the pre-constructed canvas according to a line connecting the positions of the target recognition object in the two successively captured first video images, wherein a length of width sides of the rectangular region is equal to a diameter of a circular region of the circular regions, the width sides of the rectangular region are sides perpendicular to the line, and midpoints of the width sides of the rectangular region coincide with center points of the circular regions, the circular regions and the rectangular region belong to a trajectory; and
      drawing the trajectory according to every two successively captured first video images until the trajectory is complete to obtain the trajectory image.

2. The material display method according to claim 1, wherein the obtaining the plurality of target unit effect images according to the trajectory image comprises:
   superimposing the trajectory image on a material image corresponding to the target element to obtain a unit effect image; and
   performing replication and mirroring operations on the unit effect image to obtain the plurality of target unit effect images.

3. The material display method according to claim 2, wherein the superimposing the trajectory image on the material image corresponding to the target element to obtain the unit effect image comprises:
   mirroring the trajectory image to obtain a mirror image corresponding to the trajectory image; and
   superimposing the trajectory image and the mirror image on different regions of the material image corresponding to the target element to obtain the unit effect image.

4. The material display method according to claim 1, further comprising:
   performing a blur process on the trajectory image to make the trajectory have a glowing effect in the trajectory image.

5. The material display method according to claim 4, wherein the blur process is a Gaussian blur process.

6. The material display method according to claim 1, wherein a length of length sides of the rectangular region is directly proportional to a length of the line, and the length sides of the rectangular region are sides parallel to the line.

7. The material display method according to claim 1, wherein the generating the target element according to the plurality of target unit effect images comprises:
   moving each of the plurality of target unit effect images along a path corresponding to the each of the plurality of target unit effect images respectively to attach the each of the plurality of target unit effect images onto a geometric surface of the plurality of geometric surfaces corresponding to the each of the plurality of target unit effect images to obtain the target element.

8. The material display method according to claim 1, wherein the displaying the target element in the captured second video image comprises:
displaying, in the captured second video image, the target element by rotation with a rotation axis corresponding to the solid geometric structure as a rotation center.

9. The material display method according to claim 1, wherein the displaying the target element in the captured second video image comprises:
displaying the target element in a subsequently captured second video image.

10. The material display method according to claim 1, further comprising:
adding, in a subsequently captured second video image, at least one of a foreground image, a filter, a text, or a sticker that matches the target element.

11. A non-transitory computer-readable storage medium, comprising:
computer program instructions that when executed by at least one processor, cause the at least one processor to:
obtain captured first video images;
obtain a trajectory image according to position information of a target recognition object in the captured first video images, wherein, to obtain the trajectory image according to the position information of the target recognition object, the at least one processor is configured to: perform an image recognition on the captured first video images to determine whether the target recognition object is comprised in each of the captured first video images, and obtain the position information of the target recognition object in each of the captured first video images, wherein the target recognition object is a particular part of a human body;
obtain a plurality of target unit effect images according to the trajectory image; and
generate a target element according to the plurality of target unit effect images, and display the target element in a captured second video image, wherein the target element has a main body which is a solid geometric structure comprising a plurality of geometric surfaces, and the plurality of target unit effect images are attached to the plurality of geometric surfaces respectively to display the plurality of target unit effect images on the plurality of geometric surfaces,
wherein the obtaining the trajectory image according to the position information of the target recognition object in the captured first video images comprises:
drawing two circular regions on a pre-constructed canvas according to positions of the target recognition object in two successively captured first video images;
drawing a rectangular region on the pre-constructed canvas according to a line connecting the positions of the target recognition object in the two successively captured first video images, wherein a length of width sides of the rectangular region is equal to a diameter of a circular region of the circular regions, the width sides of the rectangular region are sides perpendicular to the line, and midpoints of the width sides of the rectangular region coincide with center points of the circular regions, the circular regions and the rectangular region belong to a trajectory; and
drawing the trajectory according to every two successively captured first video images until the trajectory is complete to obtain the trajectory image.

12. An electronic device, comprising:
a memory configured to store computer program instructions; and
a processor configured to execute the computer program instructions to cause the processor to:
obtain captured first video images;
obtain a trajectory image according to position information of a target recognition object in the captured first video images;
obtain a plurality of target unit effect images according to the trajectory image;
generate a target element according to the plurality of target unit effect images; and
display the target element in a captured second video image,
wherein the target element has a main body which is a solid geometric structure comprising a plurality of geometric surfaces, and the plurality of target unit effect images are attached to the plurality of geometric surfaces respectively to display the plurality of target unit effect images on the plurality of geometric surfaces,
wherein the obtaining the trajectory image according to the position information of the target recognition object in the captured first video images comprises:
drawing two circular regions on a pre-constructed canvas according to positions of the target recognition object in two successively captured first video images;
drawing a rectangular region on the pre-constructed canvas according to a line connecting the positions of the target recognition object in the two successively captured first video images, wherein a length of width sides of the rectangular region is equal to a diameter of a circular region of the circular regions, the width sides of the rectangular region are sides perpendicular to the line, and midpoints of the width sides of the rectangular region coincide with center points of the circular regions, the circular regions and the rectangular region belong to a trajectory; and
drawing the trajectory according to every two successively captured first video images until the trajectory is complete to obtain the trajectory image.

13. The electronic device according to claim 12, wherein the obtaining the plurality of target unit effect images according to the trajectory image comprises:
superimposing the trajectory image on a material image corresponding to the target element to obtain a unit effect image; and
performing replication and mirroring operations on the unit effect image to obtain the plurality of target unit effect images.

14. The electronic device according to claim 12, wherein the superimposing the trajectory image on the material image corresponding to the target element to obtain the unit effect image comprises:
mirroring the trajectory image to obtain a mirror image corresponding to the trajectory image; and
superimposing the trajectory image and the mirror image on different regions of the material image corresponding to the target element to obtain the unit effect image.

15. The electronic device according to claim 12, wherein the computer program instructions when executed by the processor further cause the processor to:

perform a blur process on the trajectory image to make the trajectory have a glowing effect in the trajectory image.

16. The electronic device according to claim 12, wherein a length of length sides of the rectangular region is directly proportional to a length of the line, and the length sides of the rectangular region are sides parallel to the line.

17. The electronic device according to claim 12, wherein the blur process is a Gaussian blur process.

18. The electronic device according to claim 12, wherein the generating the target element according to the plurality of target unit effect images comprises:
   moving each of the plurality of target unit effect images along a path corresponding to the each of the plurality of target unit effect images respectively to attach the each of the plurality of target unit effect images onto a geometric surface of the plurality of geometric surfaces corresponding to the each of the plurality of target unit effect images to obtain the target element.

\* \* \* \* \*